United States Patent [19]
Tijsma et al.

[11] Patent Number: 5,993,505
[45] Date of Patent: Nov. 30, 1999

[54] CONTROLLED RELEASE FERTILIZER COMPOSITIONS AND PROCESSES FOR THE PREPARATION THEREOF

[75] Inventors: Edze Jan Tijsma, Maastricht; Johannes Gijsbertus Antonius Terlingen, Landgraaf, both of Netherlands; Seija Helena Aalto, Aston Lodge Park, United Kingdom; Hendrikus Gijsbertus Adrianus van Kaathoven, Nieuwstadt, Netherlands

[73] Assignee: OMS Investments, Inc., Wilmington, Del.

[21] Appl. No.: 09/083,734

[22] Filed: May 22, 1998

[51] Int. Cl.⁶ .............................. A01N 25/00; C05B 7/00
[52] U.S. Cl. ........................... 71/64.11; 71/34; 71/64.07; 71/64.13
[58] Field of Search ................ 71/64.07, 64.11, 71/64.13, 34

[56] References Cited

U.S. PATENT DOCUMENTS

| | | | |
|---|---|---|---|
| 3,223,518 | 12/1965 | Hansen | 71/64.11 |
| 3,259,482 | 7/1966 | Hansen | 71/64.11 |
| 4,449,900 | 5/1984 | Lerner | 425/6 |
| 4,549,897 | 10/1985 | Seng et al. | 71/64.11 |
| 4,657,576 | 4/1987 | Lambie | 71/64.11 |
| 5,089,041 | 2/1992 | Thompson et al. | 71/64.11 |
| 5,186,732 | 2/1993 | Thompson et al. | 71/64.11 |
| 5,399,186 | 3/1995 | Derrah et al. | 71/64.11 |
| 5,429,654 | 7/1995 | Swarup | 71/64.11 |
| 5,652,196 | 7/1997 | Lutra et al. | 71/64.11 |

FOREIGN PATENT DOCUMENTS 2111686 10/1988 Japan .................. 71/64.11

Primary Examiner—Gary P. Straub
Assistant Examiner—Melanie C. Wong
Attorney, Agent, or Firm—Jones, Day, Reavis & Pogue

[57] ABSTRACT

A controlled release fertiliser composition is provided having a fertiliser compound in a granular core with a coating applied on the core material. The fertiliser composition is structured to enable a cumulative release of fertiliser compound of less than 10% of the total weight of the fertiliser compound in the granular core within 30 days after exposure of the fertiliser composition to moisture and the coating consists of a single layer of a uniform, substantially continuous polymer film which is present on at least 90% of the granular core material A process is also provided for producing the fertiliser composition.

13 Claims, 2 Drawing Sheets

CONTROLLED RELEASE FERTILIZER COMPOSITIONS AND PROCESSES FOR THE PREPARATION THEREOF

BACKGROUND OF THE INVENTION

1. Field of the Invention

The present invention relates to controlled release fertilisers and, particularly, to fertilisers exhibiting a release of nutrients that can be delayed for a period of time after fertilisation and to processes for the preparation of such fertilisers.

2. Description of Related Art

Coated (or encapsulated) fertilizers are known to be very effective sources to provide a controlled release of nutrients for the feeding of plants. The nutrients are released at controlled rates through the fertiliser's coating resulting in a sustained feeding of plants. As a result, one application of these so-called controlled release fertilizers (CRFs) can provide the necessary nutrients for a plant that would take multiple applications of soluble fertilizers. One type of coated fertiliser in wide use is sulfur coated fertiliser, such as disclosed in U.S. Pat. No. 4,042,366, U.S. Pat. No. 4,636,242 and WO 94/29239. The release of nutrients from sulfur-coated fertilizers occurs by diffusion through imperfections in the sulfur coating and through coating breakdown. The major advantage of the sulfur coated fertilizers is their relatively low cost.

A second type of CRFs utilizes solvent applied polymer coatings. The polymeric materials applied are either thermosetting resins or thermoplastics. Examples of solvent applied thermosetting resin coated fertilizers which are currently in use are disclosed in U.S. Pat. No. 3,223,528, GB 2,202,523 and EP 0,184,869, whereas examples based on thermoplastics can be found in U.S. Pat. No. 4,019,890. Another type of encapsulated fertilizers that exhibits good controlled release properties is latex coated granular fertilizers such as those disclosed in U.S. Pat. No. 4,549,897 and U.S. Pat. No. 5,186,732. Both solvent and latex applied polymer coated fertilizers offer important benefits over sulfur-coated products concerning consistency of release rates. The majority of nutrient release is by diffusion through pores in the polymer coating, rather than release through coating imperfections.

The presence of a polymeric coating on CRFs allows for a rather uniform and consistent nutrient release, provided that the barrier properties of the polymer are sufficient. However, in general these CRFs show a high release rate of nutrients during the first period after application, which is followed by decreasing nutrient release rate during the next period. Finally, the fertiliser granules become exhausted resulting in a further decrease in release rate. In general, the accumulated nutrient release curves can be characterised mathematically by smooth quadratic (convex) curves.

Regarding CRFs which are characterised by a delayed start of the release of nutrients after application, one type is known. Multi-layered polyolefin-coated (POC) CRFs, see e.g. JP 09/241,090, have been claimed to exhibit delayed release determined by the incorporation of chemicals in the coating. The major disadvantage of these type of delayed release POC CARS is the fact that at least two coatings are required, i.e. one to give the specific release pattern and one to provide the delay. Furthermore, the presence of specific chemicals in the delayed start coating is required.

SUMMARY OF THE INVENTION

It is a primary object of the present invention to provide controlled release products, which release nutrients only after a specific period after application.

These products will be described as delayed start products/intermediates.

Another object of this invention is to provide processes for obtaining these products.

It is a more specific object of this invention to provide coated granular products, which, alone or as a component in a fertiliser product, exhibit a release pattern that is capable of supplying nutrients to plants when it is needed and a release that is not affected by soil conditions except temperature.

The foregoing and other objects of the invention are achieved by providing a controlled release fertiliser composition exhibiting a delayed start release of nutrients comprising:

i) a granular core material comprising at least one water soluble fertiliser compound, and ii) a substantially water-insoluble coating applied on the core material, in which the fertiliser composition is structured to provide a cumulative release of fertiliser compound of less than 10% of the total weight of the fertiliser compound in the granular core within 30 days after first exposure of the fertiliser composition to moisture and the coating consists of a single layer of a uniform, substantially continuous polymer film which is present on at least 90% of the granular core material.

The products of the present invention are characterised by the presence of only one layer of coating material, without the presence of specific additives. The fertiliser compositions have a delayed start release pattern, with a very low release of less than 10% occurring during a period of 30 days after exposure of the fertiliser composition to moisture. Preferably, the coating is present on at least 95% of all the granules, whereby the cumulative release of fertiliser compound(s) 30 days after exposure to moisture is less than 5%.

These delayed start type of fertiliser products will be useful as fertilizers for specific plants or as a building block in fertilizers to obtain products displaying specific release patterns. Furthermore, in accordance with the present invention, a more efficient use of fertiliser products can be attained, for example,. by applying CRFs via the 'dibbling' technique.

The products of the present invention are prepared by a process comprising:

i) providing a granular core material comprising at least one water soluble fertiliser compound, and ii) coating the core material with a substantially water-insoluble coating, in which the fertiliser composition is formed in a manner such that less than 10% of the total weight of the fertiliser compound in the granular core will release from the fertiliser composition within 30 days after exposure of the fertiliser composition to moisture and in that the core material is coated with a single layer of a coating material which forms a uniform, substantially continuous polymer film on the core material with at least 90% of all the granular core material being coated with the film.

Preferably, at least 95% of all the granules are coated with the film, whereby the cumulative release of fertiliser compound(s) 30 days after exposure to moisture is less than 5%.

DETAILED DESCRIPTION OF THE PREFERRED EMBODIMENT(S)

Figure 1A:
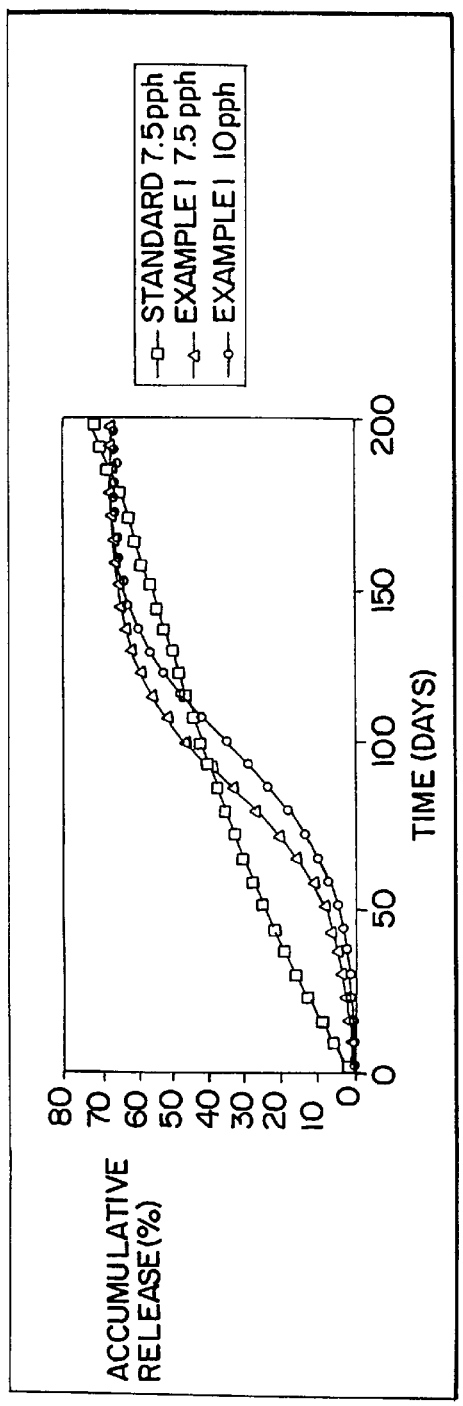
FIG. 1a shows a comparison of the release pattern of standard coated 17-10-13+traces and of 17-10-13+traces coated according to Example 1.

The granular core material may contain any type of water soluble fertiliser compound(s). Known chemical fertilizers including potassium nitrate, potassium sulphate, urea, ammonium nitrate, monopotassium phosphate, ammonium phosphate, or fertilizers obtained from compounding a mixture of these fertilizers can be used. In a preferred embodiment the fertilizers contain micronutrients.

The coating material applied can be based on any kind of material, thermoplastic or thermoset, which is able to form a uniform continuous polymer film.

In the present invention the thermoplastic coated material may comprise vinyl resins such as poly(vinyl acetate), poly(vinyl alcohol), poly (vinyl chloride), poly (vinylidene chloride), poly(vinyl pyrrolidone), poly(vinyl acetal), poly(vinyl methylacetamide), polyolefines such as polyethylene, polypropylene, polyisobutylene, styrene-based polymers, acrylic polymers, polyesters such as poly(alkylene terephthalate), poly (caprolactone), poly(oxy alkylene)s, e.g. poly(ethylene oxide), poly (propylene oxide), and cellulose derivatives, e.g. celluloseacetate polyamides ployamines polycarbonates polyimides polysulfones polysulfides polysaccharides In the present invention the thermosetting coated material may comprise polyesters such as an alkyd, a modified alkyd, epoxy resins, urethane resins aminoplastics.

Optionally the coating may comprise non-specific additives (inert fillers), such as talc. The coating material may be applied from solution or from dispersion. When applied from a solution it is preferred that a solvent is used in which the resin dissolves at all temperatures, thus making it possible to use resin solutions having a relatively high solids content (more than 40% by weight).

The coating may be applied to the fertiliser by a number of methods. However, in a most preferred embodiment of this invention the coating process is performed in either a coating drum or a fluidized bed, such as a Würster column. The thickness of the coating applied on the fertiliser granules is preferably between 5 and 110 $\mu$m, more preferably between 25 and 90 $\mu$m. Typically, these values correspond to an amount of coating material applied of 1 to 20 pph by weight and 4 to 15 pph by weight, respectively.

The coating level of at least 90% which is required by the present invention may be obtained by employing a specific coating procedure and/or by using specific core material.

In a preferred embodiment of the present process the granular core material has a regular shape, more preferably a substantially round or spherical shape, which enables the formation of the uniform, substantially continuous polymer film coating. Preferably, at least 95% of the core granules have a substantially round shape. Substantially round, granular core material may be obtained by processing a granular starting material in a spiral separator.

The test employed herein for purposes of determining the roundness or sphericity of the granular core material is based on a particle shape classifier developed by Carpenter and Deitz (Research Paper 2238, 3. of Res. Of the NBS 41(37), September 1951) which was modified for separating spherical and nonspherical granules as follows:

A device consisting of a turntable 20" in diameter was mounted at an angle of 9° with the horizontal. The turntable was rotated at 4 rpm. Granules were fed from a small belt feeder at 11.5 grams/min. onto the edge of the rotating turntable approximately 1" from the center on the counter clockwise side. This low feed rate allowed individual granules to roll on the turntable with a minimum of interference between each other. Spherical granules rolled straight and fell off the bottom of the turntable into a recovery pan. Most nonspherical granules rolled in short irregular paths and tended to stop on the turntable and they were carried around and blown off the turntable into another recovery pan by a stream of air directed parallel to the surface of the turntable.

For this testing, the granules were fed from the feeder into a glass funnel with a 7 mm opening and short stem bent at an angle of approximately 100°. The tip of the funnel was no more than ¼" from the edge of the turntable and as close as possible to the turntable without touching. One hundred gram samples were used, and the turntable was cleaned after each sample with glass cleaner to reduce friction. The nonspherical granules were weighed and, thus, the percent of spherical granules was determined.

When processing a granular starting material in a spiral separator, a product having at least 98% round particles or even consisting essentially completely of round particles can be obtained.

In another preferred embodiment of the process of the present invention, the coating material is applied from a solution or dispersion of the polymer, and the rate of application of the polymer material is increased during the coating step. The rate of application of the polymer material may be increased in various manners.

In one method the polymer content of the solution or dispersion is increased during the coating step. For example, when using an alkyd resin solution the resin content of the solution is increased from 45–55% by weight at the beginning of the coating step to 60–70% by weight at the end of the coating step. In a preferred embodiment the resin content is increased linearly.

In a second method the rate of addition of the solution or dispersion is increased during the coating step.

The following examples illustrate the practice of the invention. All parts are by weight unless otherwise indicated.

EXAMPLE 1

A granular NPK fertiliser comprising about 90% by weight of round particles was processed in a spiral separator prior to the coating process. The composition of the fertiliser is 17% N, 10% $P_2O_5$ and 13% $K_2O$. Furthermore trace elements (Fe, Mn, Zn, Cu, B and MgO) were present in the granule. This fertiliser is abbreviated as 17-10-13+traces in the following. After processing in the spiral separator, which is designed to separate round versus non-round particles by using momentum-generated by rolling particles, the fraction comprising the round particles was used in a coating trial. In a drum coater 10 kg of this product was placed and heated. After reaching a temperature of 80° C., a solution of a modified unsaturated oil copolymer-based alkyd resin in white spirit was pumped onto the fertiliser. During the coating process the percentage of solids was maintained at one level. In total 0.81 kg of solids was added to the fertiliser during the coating process, yielding a coating level of 7.5 pph (parts per hundred on weight basis). After coating the fertiliser was cooled down to room temperature. The release of the coated (17-10-13+traces) fertiliser was tested by placing 20 g of this product in 400 ml water of 21° C. in a closed plastic bottle. At certain time intervals the water was replaced and the conductivity of the solution was measured. The measured conductivity can be translated into a total amount of nutrients released using appropriate calibration constants. These calibration constants are specific for a certain type of fertiliser and need to be determined experimentally. However the release can also be measured by measuring the amount of nutrients released by using standard chemical analysis methods.

Figure 1B:
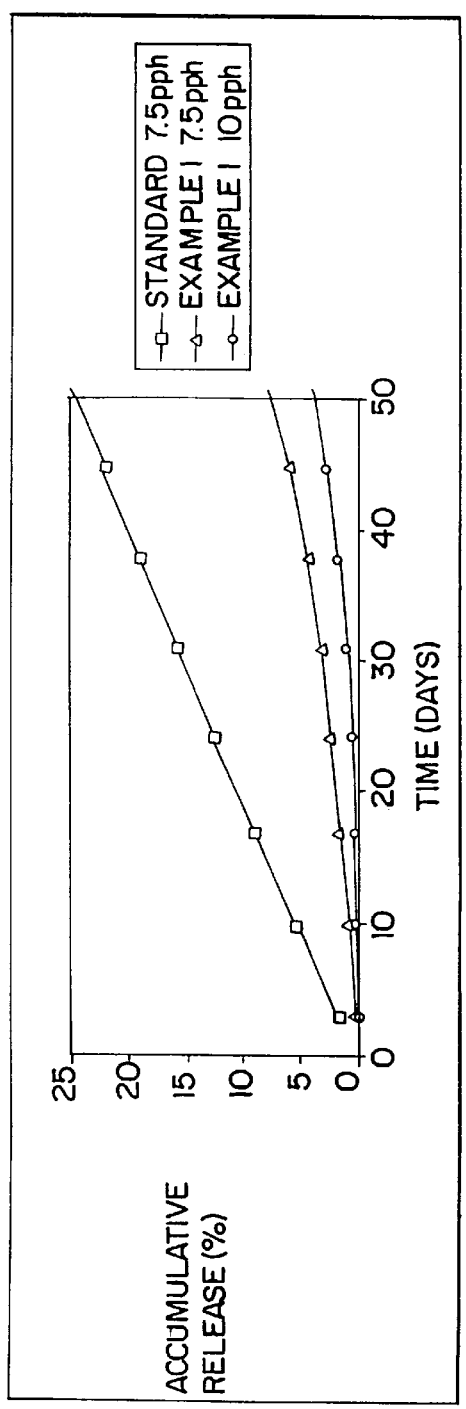
FIG. 1b shows the same comparison as FIG. 1a, the initial release being given in more detail.

The release pattern of the 17-10-13+traces coated and tested using the methods given above, is given in FIG. 1A, along with release data of a coated product based on a NPK substrate that was not processed in a spiral separator before coating. As shown in FIG. 1A and more specifically in FIG. 1B the delay time can be varied by varying the coating level. When 17-10-13+traces was coated with a higher coating level (10 pph) according to the same procedure a longer delay time is observed.

EXAMPLE 2

A granular NPK fertiliser (17-10-13+traces) was coated with an alkyd resin in a coating drum. In a drum coater 10 kg of this product was placed and heated. After reaching a temperature of 80° C., a solution of a modified unsaturated oil copolymer-based alkyd resin in white spirit was pumped onto the fertiliser. At the beginning of the coating process a more diluted, thus a solution containing less solids, was used than at the end of the coating process. In total 0.81 kg of solids was added to the fertiliser during the coating process, yielding a coating level of 7.5 pph (parts per hundred on weight basis). After coating the fertiliser was cooled down to room temperature.

Figure 2:
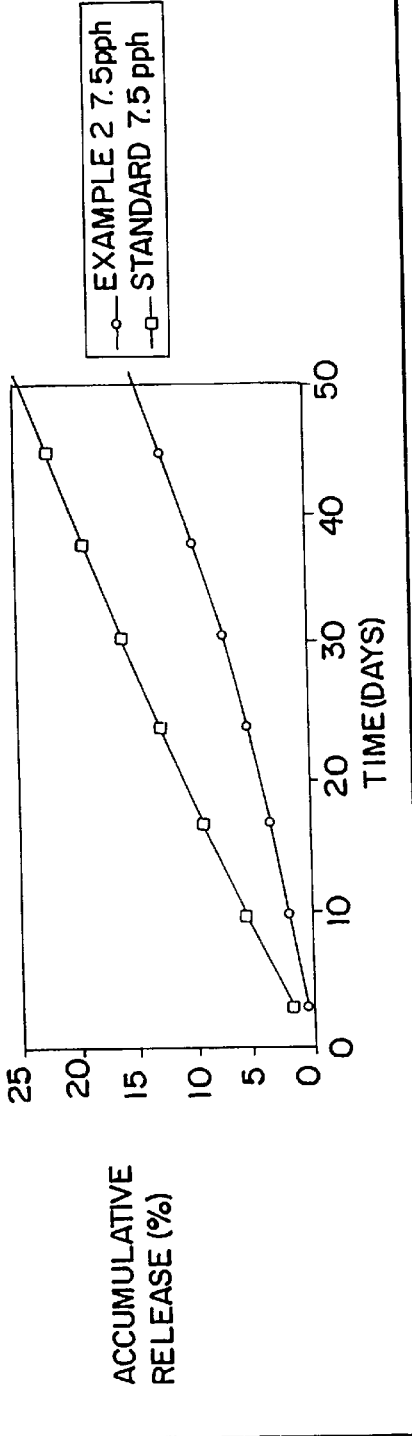
FIG. 2 shows a comparison of the initial release pattern of standard coated 17-10-13+traces and of 17-10-13+traces coated according to Example 2.

The release of nutrients, which was measured as described in Example 1, is presented in FIG. 2. After a certain delay time, the product starts releasing its contents. For comparison a product coated via a standard procedure with the same coating level (7.5 pph) is given. The standard coating procedure is comparable to that given above, except that a standard solids concentration is used during the coating process. The solids concentration is not varied during the coating procedure. It is clear from FIG. 2 that the standard product starts releasing immediately.

EXAMPLE 3

Figure 3:
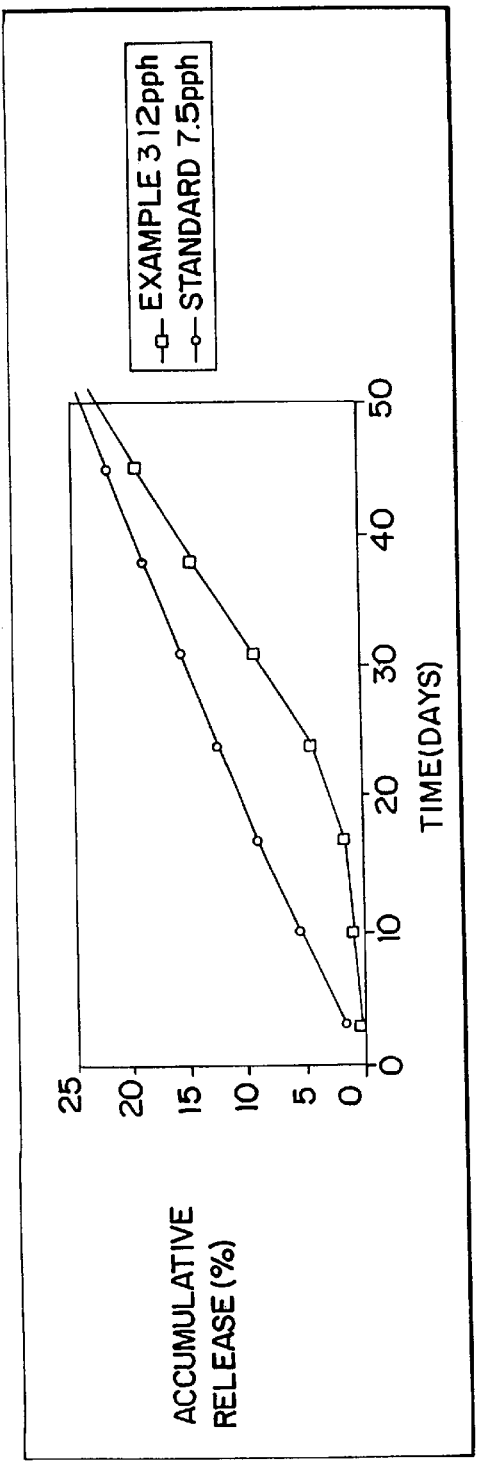
FIG. 3 shows a comparison of the initial release pattern of standard coated 17-10-13+traces and of 16-10-20 coated according to Example 3.

A granular NPK fertiliser (16-10-20) was coated with an acrylic dispersion, useful to obtain a coating with a very low water vapour transmission rate, in a fluidized bed. Granular 16-10-20, 9 kg, was added into a pilot-scale fluidised bed Würster-type column and pre-heated during 14 minutes at 70° C. An acrylic dispersion, 3200 g, 1250 g on a dry solids basis, was applied to the fluidized NPK granules by spraying from the bottom of the bed at a starting rate of 42 g/min. The rate of addition was gradually increased to 63 g/min (at 37 min) and subsequently to 84 g/min (at 58 min). The drying air flow rate was 8 L/min and entered the bed at a temperature of 70° C. The total coating time was 58 min, which was followed by an additional 15 minutes of drying at an air inlet temperature of 70° C. and a 5 minutes cooling phase using ambient air resulting in a product having a coating level of 12 pph. The release pattern of the resulting product (see FIG. 3) was determined as described in Example 1.

Although the invention has been described in its preferred forms with a certain degree of particularity, it is to be understood that the present disclosure has been made by way of example only. Numerous changes in the details of the compositions and in the method of their preparation will be apparent without departing from the spirit and scope of the invention, as defined in the appended claims.

We claim:

1. A controlled release fertiliser composition comprising:
   a) a granulated core material comprising at least one water soluble fertiliser compound, said granulated core material comprising granules having substantially smooth outer surfaces with at least 95% of the granules being substantially spherical and
   b) a substantially water-insoluble coating applied on the granulated core material,
   c) the fertiliser composition being structured to provide a cumulative release of fertiliser compound of less than 10% of the total weight of the fertiliser compound in the granulated core material within 30 days after exposure of the fertiliser composition to moisture; and
   d) the coating consisting of a single layer of a uniform, substantially continuous polymer film which is present on at least 90% of the granules in the granulated core material.

2. The controlled release fertiliser composition according to claim 1, wherein the fertiliser composition is structured to provide a cumulative release of fertiliser compound after 30 days of less than 5% and the coating is present on at least 95% of the granulated core material.

3. The controlled release fertiliser composition according to claim 1, wherein the coating has a thickness of 5 to 110 μm.

4. A process for preparing a controlled release fertiliser composition exhibiting delayed release of nutrients comprising:
   a) providing a granulated core material comprising at least one water soluble fertiliser compound, said granulated core material comprising granules having substantially smooth outer surfaces with at least 95% of the granules being substantially spherical, and
   b) coating the granulated core material with a single layer of a substantially water-insoluble coating material to form a uniform. substantially continuous polymer film on the granulated core material with at least 90% of the granules being coated with the film, wherein a fertiliser composition is formed which releases less than 10% of the total weight of the fertiliser compound, in the granulated core material from the fertiliser composition within 30 days after exposure of the fertliser composition to moisture.

5. The process according to claim 4, wherein the fertiliser composition is formed in a manner such that less than 5% of the total weight of the fertiliser compound in the granulated core will release from the fertiliser composition within 30 days after first exposure of the fertiliser composition to moisture and at least 95% of the granulated core material is coated with the film.

6. The process according to claim 4, wherein the layer of coating material has a thickness of 5 to 110 µm.

7. The process according to claim 7, wherein the substantially spherical, granulated core material is obtained by processing granulated material in a spiral separator.

8. The process according to claim 7, wherein at least 98% of the granules are substantially spherical.

9. The process according to claim 7, wherein the coating material is applied from a solution or dispersion of the polymer, and the rate of application of the polymer material is increased during the coating step.

10. The process according to claim 9, wherein the polymer content of the solution or dispersion is increased during the coating step.

11. The process according to claim 10, wherein the core material is coated with an alkyd resin solution and the resin content of the solution is increased from 45–55% by weight at the beginning of the coating step to 60–70% by weight at the end of the coating step.

12. The process according to claim 11, wherein the resin content is increased linearly.

13. A process for preparing a controlled release fertiliser composition exhibiting delayed release of nutrients comprising:

a) providing a granular core material comprising at least one water soluble fertiliser compound, and b) coating the core material with a substantially water-insoluble coating applied from a solution or dispersion of a polymer material with the rate of application of the polymer material and the rate of addition of the solution or dispersion being increased during the coating step, wiereby a fertiliser composition is formed in a manner such that less than 10% of the total weight of the fertiliser compound in the granular core will release from the fertiliser composition within 30 days after exposure of the fertiliser composition to moisture and the core material is coated with a single layer of a coating material which forms a uniform, substantially continuous polymer film on the core material with at least 90% of all the granular core material being coated with the film.

* * * * *

UNITED STATES PATENT AND TRADEMARK OFFICE
CERTIFICATE OF CORRECTION

PATENT NO.     : 5,993,505
DATED          : November 30, 1999
INVENTOR(S)    : Edze Jan Tijsma et al.

Page 1 of 1

It is certified that error appears in the above-identified patent and that said Letters Patent is hereby corrected as shown below:

Column 1,
Line 59, change "CARS" to -- CRFs --.

Column 7,
Lines 10, 13 and 15, change "7" to -- 4 --.

Column 8,
Line 14, change "wiereby" to -- wherein --.

Signed and Sealed this

Fourteenth Day of May, 2002

Attest:

Attesting Officer

JAMES E. ROGAN
*Director of the United States Patent and Trademark Office*